United States Patent [19]

Nelson

[11] 4,347,698
[45] Sep. 7, 1982

[54] ROTARY-REACTIVE INTERNAL COMBUSTION ENGINE 2-360

[76] Inventor: Alexander Nelson, 606 E. Juneau Ave., Milwaukee, Wis. 53202

[21] Appl. No.: 169,643

[22] Filed: Jul. 17, 1980

[51] Int. Cl.$^3$ .............................................. F02C 5/04
[52] U.S. Cl. ................................................... 60/39.34
[58] Field of Search ........................... 60/39.34, 39.95; 415/80, 82

[56] References Cited

U.S. PATENT DOCUMENTS

| | | | |
|---|---|---|---|
| 3,716,989 | 2/1973 | Moreira | 60/39.34 |
| 3,804,549 | 4/1974 | Kellenbarger | 60/39.34 |
| 3,811,275 | 5/1974 | Mastrobuono | 60/39.34 |

*Primary Examiner*—Louis J. Casaregola
*Attorney, Agent, or Firm*—Ira Milton Jones

[57] ABSTRACT

The present invention relates to a rotary-reactive internal combustion engine in which the reactive powers of the exhaust gas add to the driving torque of the present engine. The classification of this engine: The kind of the fuel is a liquid fuel. One cycle consists of the three working periods. The ignition of the fuel realizes inside the two combustion chambers by the high-tension ignition. One cycle is corresponding to a 360° turning angle of the shaft of the rotor. The method of the formation of the mixture is the external mixing or is the pump fuel-air mixture with a very high pressure feed. The constructional distinctness is the rotary engine. The method of the formation of the power is the reactive power. The process of the scavenging is through forced scavenging. The present engine will be able to create the power and will work with a high speed rotation. This engine system allows it to use both synthetic fuel and common gasoline. The present engine is very economical and has a very simple mechanical design. By the proposed arrangement in accordance with the present invention is achieved the effect of a direct utilization of the reactive power of the exhaust gas.

9 Claims, 22 Drawing Figures

ROTARY-REACTIVE INTERNAL COMBUSTION ENGINE 2-360

BACKGROUND OF THE INVENTION

It's known that the present combustion engines have an efficiency of approximately 30%. This is a serious construction defect. The principle construction defect which the present combustion engines have is the great consumption of the natural fuel-gasoline. The most serious defect is the impossibility to make use of synthetic fuel inside the usual combustion engines. Another defect which many of the present engines have is the construction complexity of many systems and assemblies. Next a construction defect which many of the present combustion engines have is the incomplete removal of the exhaust gas. Consequently, the deterioration of the power of the present engines is on the average of 25%. Another construction defect is the low amount of rotations per minute. It's known that the greater amount of rotations per minute, the more powerful the engine.

BRIEF SUMMARY OF THE INVENTION

The present invention solves the above problems and the construction defects. While researching the present invention, these were the goals that I formulated: 1. To insure that the engine would run on synthetic fuel and on gasoline. 2. To reduce the consumption of the fuel. 3. To increase the effective power of the engine. 4. To insure the full removal of the exhaust gas from the combustion chambers of the engine. 5. To increase the power of the engine. 6. To eliminate all complexity of too many systems and assemblies that the present combustion engines have.

All the foregoing problems were solved completely. As a result, the rotary-reactive internal combustion engine 2-360 was elaborate. The new principle of the present engine allows it to use both synthetic fuel and common gasoline. Synthetic fuel for the present engine is methylated alcohol. The decision of utilization of this fuel isn't accidental. It's known that any working process inside any combustion engine is characterized by the main qualitative indices of any liquid fuel. These are: 1. The calorific effect of the fuel-air mixture. 2. The upper and the lower limit of the ignition. 3. The latent heat of vaporization. 4. Octane Number. By combining these characteristics in both gasoline and synthetic fuel, it is possible to satisfy one's needs. The calorific effect of the fuel-air mixture of gasoline is 826 calories/cubic meter and calorific effect of the fuel-air mixture of synthetic fuel is 824 calories/cubic meter. The measures are practically equal. The overhead and the lower limit of the ignition of gasoline is from 25% to 1.8%. The overhead and the lower limit of the ignition of synthetic fuel is from 28% to 5%. Synthetic fuel has 1.25 more than gasoline. Consequently, the consumption of synthetic fuel is 25% greater than the consumption of gasoline. The latent heat of vaporization of gasoline is 75 calories/kilogram. The latent heat of vaporization of synthetic fuel is 230 calories/kilogram. Synthetic fuel has characteristics three times more efficient than gasoline. This circumstance defines the high cooling quality and anti-knock quality of synthetic fuel. Moreover the higher the heat of vaporization the lower the temperature of synthetic fuel in the moment of inflation. This circumstance leads to the density of charge. This results in an averadge power increase of 5%. Octane Number of gasoline runs 66 to 96. Octane Number of synthetic fuel is 100. It is considerably better. As a result, the characteristics of synthetic fuel in many aspects are better than gasoline.

DESCRIPTION OF THE DRAWINGS

The above invention will be more easily understood from the following detailed description of a preferred embodiment when taken in conjunction with the attached drawings in which.

DESCRIPTION OF THE PREFERRED EMBODIMENTS

Referring now to the drawing wherein like reference numerals are used throughout the views to designate like parts and more particularly to FIGS. 1-4.

The present engine comprises of a driving part-rotor, which is rotating in circular motions and also comprises of a stationary part or stator.

The rotor comprises a metallic disk 1 and a shaft 2. The metallic disk 1 has one pair of the cylindrical combustion chambers or cylinders. This pair comprises a left cylindrical combustion chamber 3 and a right cylindrical combustion chamber 4. Each of the cylindrical combustion chambers 3 and 4 are disposed at an 180° angle between each other. Each of the cylindrical combustion chambers 3 and 4 have one round port 5. Each of the round ports 5 have the same diameter. One reactive cylindrical duct 6 branches off from each of the cylindrical combustion chambers 3 and 4 at a 90° angle and goes in the opposite direction from the rotation of the shaft 2 of the rotor. Each of the reactive cylindrical ducts 6 have the same diameter. Each of the reactive cylindrical ducts 6 has one reactive oval nozzle 7. Each of the reactive oval nozzles 7 has the space of an 8° angle.

The stationary part or stator comprises a metallic left stationary housing 8 and also a the metallic right stationary housing 9. The left stationary housing 8 and the right stationary housing 9 have absolute the same design, but they are disposed at an 180° angle between each other.

Referring now only to the left stationary housing 8. The left stationary housing 8 has one round hole 10 in the center, which serves for assembly of the shaft 2 of the rotor by ball-bearings 11. The left stationary housing 8 has eight holes 12 and one hole 13 which serve for assembly of the present engine. One hole 13 is positioned opposite one hole 12. The eight holes 12 are disposed at a 45° angle between each other. The left stationary housing 8 has one admission round port 14. The admission round port 14 has in the center one injection nozzle 15. The admission round port 14 and the injection nozzle 15 serve to feed the fuel-air mixture 16 inside the corresponding combustion chamber or cylinder 3 with a very high pump pressure. The admission round port 14 is disposed at a 39° angle from an engine center line 17. The admission round port 14 has the same diameter as the round port 5 of the cylindrical combustion chamber. The left stationary housing 8 has one sparking-plug 18. It is located inside a niche 19 for the sparking-plug. The sparking-plug 18 is disposed at a 30° angle from the admission round port 14. The left stationary housing 8 has an exhaust canal 20, which serves for the exhaust gas removal. The exhaust canal 20 extends through an arc 8 232°. The exhaust canal 20 is disposed at a 34° angle on the one hand and is disposed at a 94° angle on the other hand with respect to the center line 17. The left stationary housing 8 has an admission canal 21, which serves for the high piston pressure of the fresh-air 22 supply inside each of the cylindrical combustion chambers 3 and 4. The admission canal 21 extends through a 52° angle. The admission canal 21 is disposed at a 274° angle on the one hand and is disposed at a 34° angle on the other hand with respect to the center line 17. The admission canal 21 has a wall 36. The wall 36 has the same 8° angle as the reactive oval nozzle 7. The wall 36 is disposed at a 266° angle on the one hand and is disposed at an 86° angle on the other hand with respect to the center line 17. The left stationary housing 8 has one scavenging round port 23, which serves for the scavenging gas removal. The scavenging round port 23 is disposed at a 21° angle to the center line 17. The scavenging round port 23 has the same diameter as the round port 5 of the cylindrical combustion chamber.

An exhaust pipe 24 that serves for the exhaust gas removal connects with the left stationary housing 8 and also with the right stationary housing 9. The outlet pipe 24 has the two exits. Each of the exits of the outlet pipe 24 is located opposite one sparking-plugs 18.

The two admission pipes 25 serve for the high piston pressure of the fresh-air 22 supply inside each of the admission canals 21. Each of the admission pipes 25 is located opposite the corresponding admission canal 21.

Two additional outlet pipes 26 serve for the scavenging gas removal. Each of the outlet pipes 26 is connected separately with the left stationary housing 8 and with the right stationary housing 9 opposite the respective scavenging round ports 23. The eight engine bolts 27, the eight screw-nuts 28, the eight holes 12 and the one hole 13 of each of the stationary housing 8 and 9, and also the two cylindrical spacing sleeves 29 and the six cylindrical spacing sleeves 30 serve for assembly of the present engine. The two cylindrical spacing sleeves 29 have the same length as the thickness of the metallic disk 1 of the rotor. The six cylindrical spacing sleeves 30 have a length equal to one-half the thickness of the metallic disk 1 of the rotor. The two cylindrical spacing sleeves 29 and the six cylindrical spacing sleeves 30 serve for the control of the interval between the left stationary housing 8 and also between the right stationary housing 9.

Each complete cycle of the present engine consists of three working periods. Switching on of this engine is from an electrical starter. The metallic disk 1 of the rotor rolls off in the direction of an arrow 31. In the beginning of the first period, the ports 5 of the cylinders are simultaneously communicated with their respective admission ports 14. The fuel-air mixture 16 is injected inside each of the cylindrical conbustion chambers 3 and 4 with a very high pump pressure through each of the injection nozzles 15 and also through each of the admission round ports 14. In this location each of the reactive oval nozzles 7 remain closed by the left stationary housing 8 and also by the right stationary housing 9. Inside each of the cylindrical combustion chambers 3 and 4 there occurs the process of the inflation of the fuel-air mixture 16. The first period is finished when the round ports 5 of the combustion chambers pass their respective admission round ports 14. The second periods begins.

At this time the round ports 5 of the cylindrical combustion chambers 3 and 4 are in register with the niches 19 for the sparking-plug. The sparking-plugs 18 are then ignited simultaneously to effect the ignition 32 of the fuel-air mixture 16. In consequence of the process of the ignition 32 of the fuel-air mixture 16 the chemical power of the fuel transforms into thermic power, and after that, the thermic power transforms into mechanical power. Exactly at this moment starts the simultaneous communication of the reactive oval nozzles 7 with the exhaust canals 20 for removal of the exhaust gas. Inside each of the cylindrical combustion chambers 3 and 4 there occurs a very high pressure of the expanding gas 33. In consequence of the different pressure inside each of the cylindrical combustion chambers 3 and 4 and each of the exhaust canals 20 for the exhaust gas removal there occurs the natural relaxation of the pressure. The expanding gas 33 instantly transforms into the exhaust gas 34, and then it travels through each of the reactive cylindrical ducts 6 and also through each of the reactive oval nozzles 7. From here the exhaust gas 34 is penetrated inside each of the exhaust canal 20 for the exhaust gas removal. Then the exhaust gas 34 throws itself out to the atmosphere through each of the exits of the outlet pipe 24 for the exhaust gas removal. On the whole two reactive powers $P_1$ 37 are gained. By the principle of the action and the reaction the two diametrically opposite powers $P_2$ 38 are gained which are the same quantity of the reactive powers $P_1$ 37, therefore acquiring a driving torque M 39 of the rotor. As a result the reactive powers $P_1$ 37 of the exhaust gas 34 are added to the driving torque M 39 of the rotor. So finally there occurs an ignition stroke of the present engine. The driving torque M 39 of the rotor is calculated by this formula $$M = 2 \cdot P_2 \cdot L$$

where
M—the driving torque M 39 of the rotor

2—the quantity of the reactive powers $P_1$ 37

$P_2$—the diametrically opposite power $P_2$ 38 is equal to the reactive power $P_1$ 37 and L—the arm L 40 of the driving torque M 39

As soon as the exhaust gas 34 finishes passing inside each of the exhaust canals 20 for the exhaust gas removal, it instantly finishes the second period.

The third period is the process of the thorough scavenging of the scavenging gas 35 inside each of the combustion chambers 3 and 4.

FIGS. 1–4 do not give an opportunity to observe the full cycle of the work of this engine. Therefore, in order to understand the work of the present engine in all three periods, it is necessary to observe the full cycle from FIGS. 5 and 6 to FIGS. 21 and 22.

Figure 1:
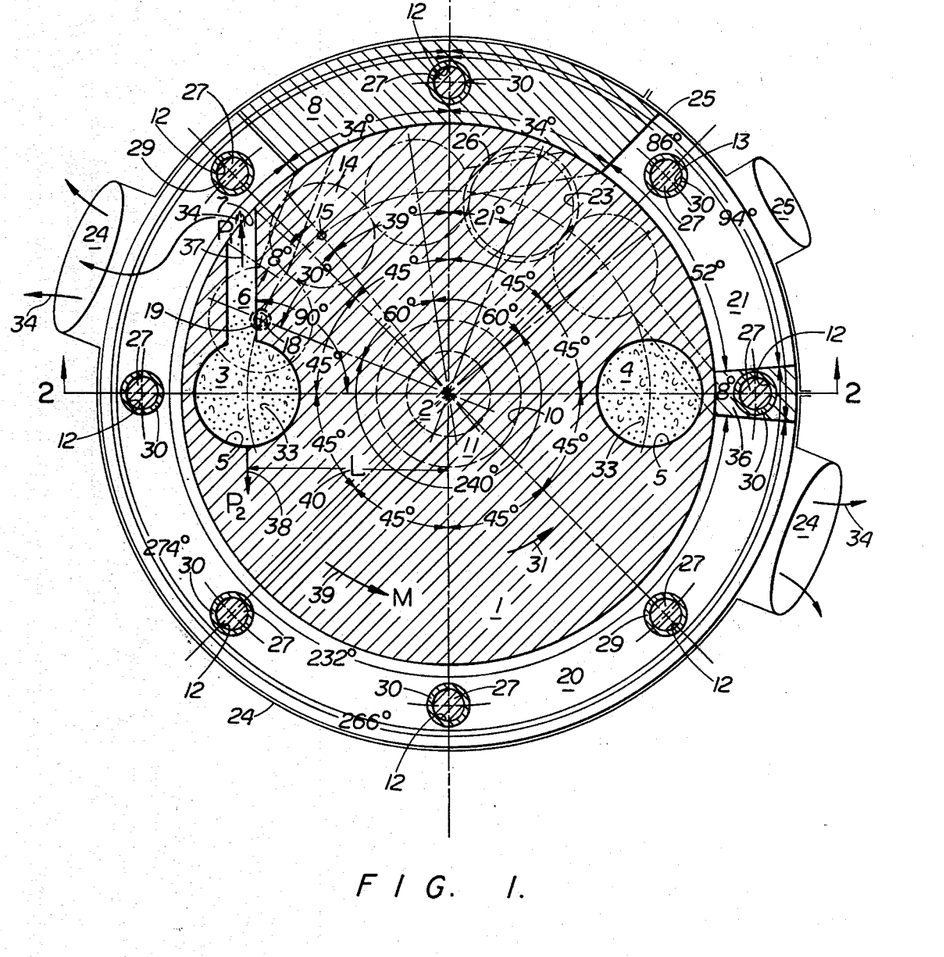
FIG. 1 is a cross sectional view along line 1—1 of FIG. 2 of the rotary-reactive internal combustion engine 2-360 of this invention.
Figure 2:
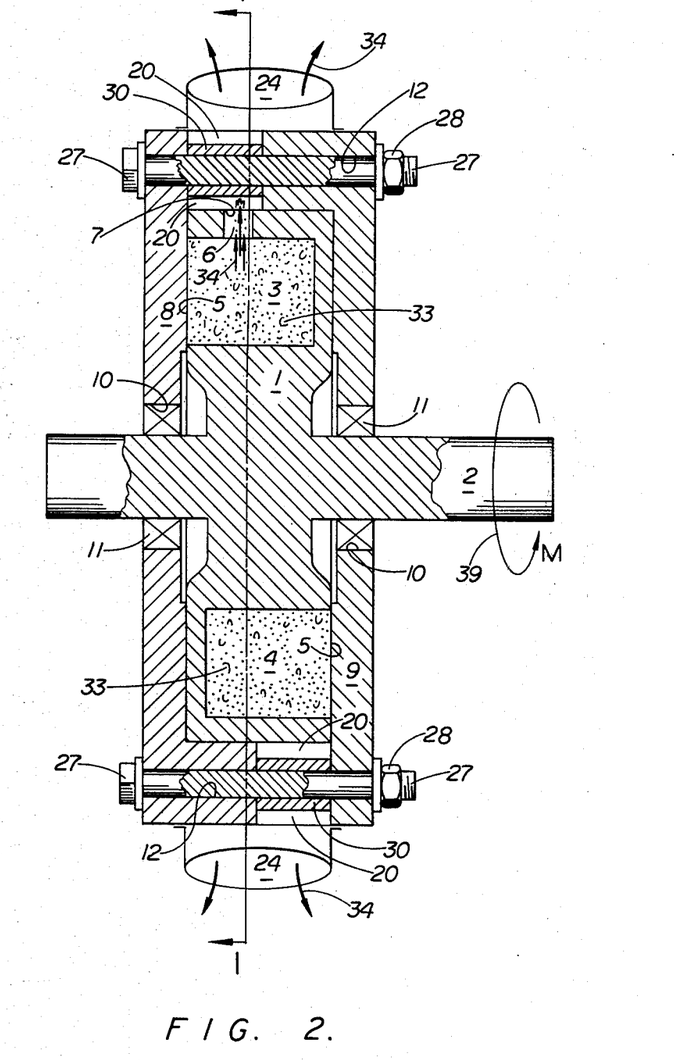
FIG. 2 is a cross sectional view along line 2—2 of FIG. 1.
Figure 3:
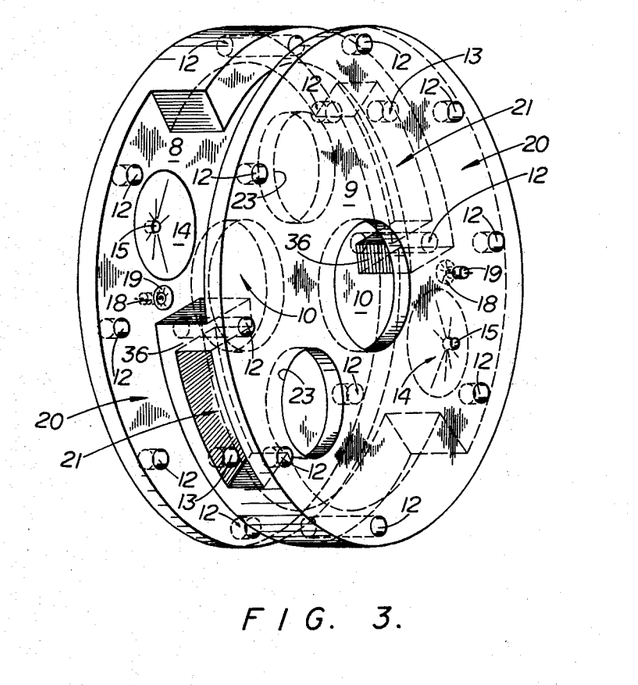
FIG. 3 is a perspective view of the stator.
Figure 4:
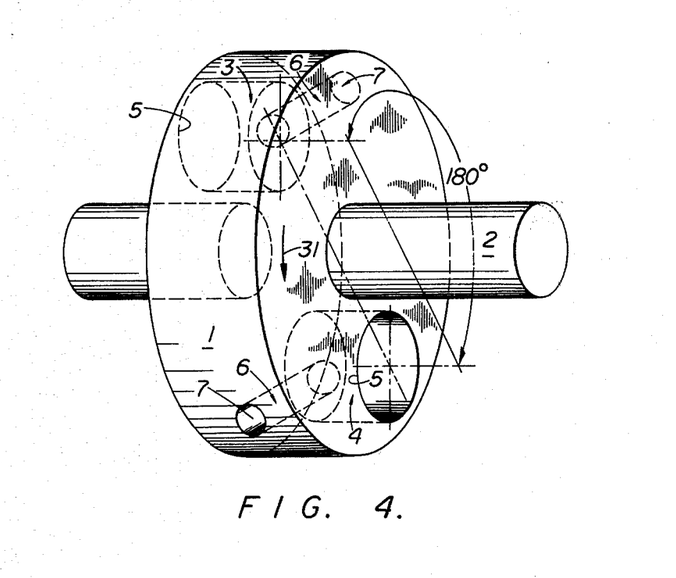
FIG. 4 is a perspective view of the rotor.
Figure 5:
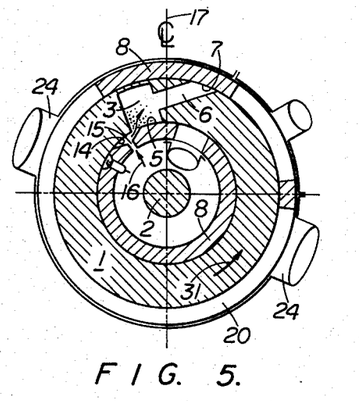
FIGS. 5 and 6 are representations of the beginning of the first period inside each of the combustion chambers.
Figure 6:
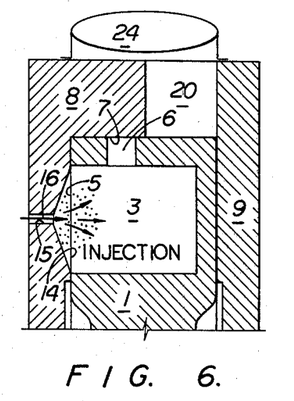

Referring now to FIGS. 5 and 6

In the beginning of the first period starts the simultaneous communication of each of the round ports 5 of the cylindrical combustion chamber with each of the admission round ports 14. The fuel-air mixture 16 is injected inside each of the cylindrical combustion chambers 3 and 4 with a very high pump pressure through each of the injection nozzles 15 and also through each of the admission round ports 14. In this location each of the reactive oval nozzles 7 remain closed with the left stationary housing 8 and also with the right stationary housing 9. Inside each of the cylindrical combustion chambers 3 and 4 there occurs the process of the inflation of the fuel-air mixture 16.

Figure 7:
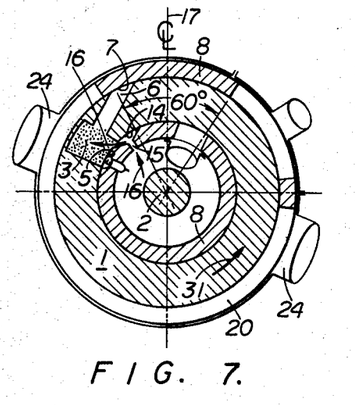
FIGS. 7 and 8 are representations of the end of the first period inside each of the combustion chambers.
Figure 8:
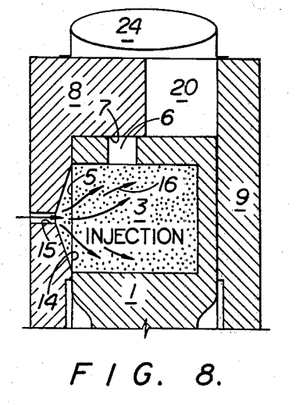

Referring now to FIGS. 7 and 8

In this moment of completion of the first period the simultaneous communication of each of the round ports 5 of the cylindrical combustion chamber with each of the admission round ports 14 is finished. In this location each of the reactive oval nozzles 7 are closed on the left stationary housing 8 and also on the right stationary housing 9. This is the end of the first period. The first period corresponds to a 60° turning angle of the shaft 2 of the rotor.

Figure 9:
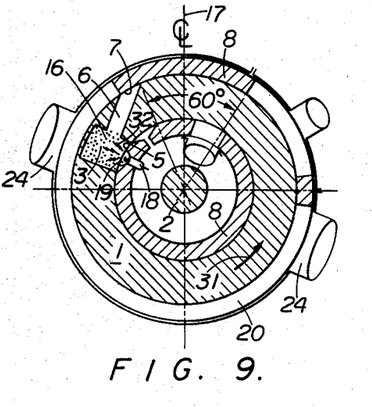
FIGS. 9 and 10 are representations of the ignition of the sparking-plug, and are representations of the beginning of the second period inside each of the combustion chambers.
Figure 10:
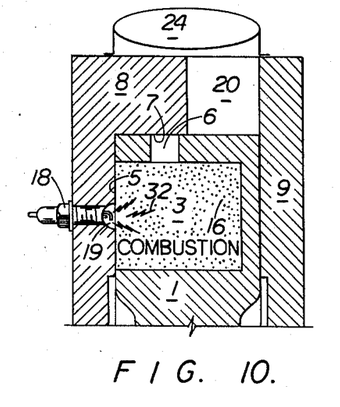

Referring now to FIGS. 9 and 10

The beginning of the second period, which corresponds to a 60° turning angle of the rotor, finds the ports 5 of the cylinders 3 and 4 in simultaneous communication with the niches 19 for the spark plugs, which are then ignited simultaneously to effect combustion of the air-fuel mixture 16 in the cylinders.

Figure 11:
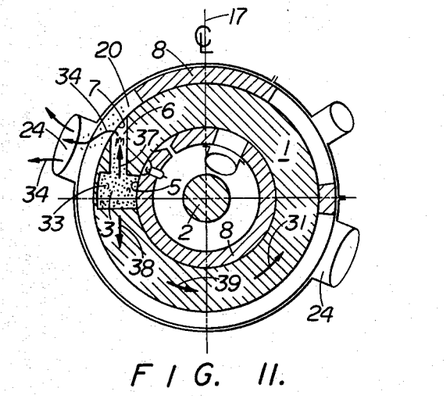
FIGS. 11 and 12 are representations of the beginning of the ignition stroke inside each of the combustion chambers.
Figure 12:
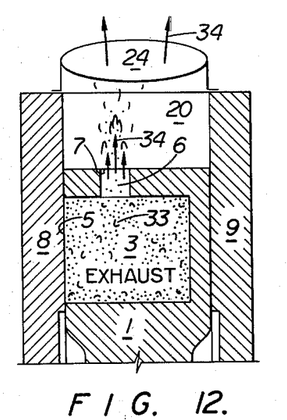

Referring now to FIGS. 11 and 12

In this moment as a result of the process of the ignition 32 of the fuel-air mixture 16 inside each of the cylindrical combustion chambers 3 and 4 a very high pressure is achieved. At this moment it is starting the simultaneous communication of each of the reactive oval nozzles 7 with each of the exhaust canals 20 for the exhaust gas removal. Inside each of the cylindrical combustion chambers 3 and 4 there occurs a very high pressure of the expanding gas 33. As a result of the different pressure inside each of the cylindrical combustion chambers 3 and 4 and each of the exhaust canals 20 for the exhaust gas removal there occurs the natural discharge of the pressure of the expanding gas 33. The expanding gas 33 instantly travels through each of the reactive cylindrical ducts 6 and also through each of the reactive oval nozzles 7. From here the exhaust gas 34 is penetrated inside each of the exhaust canals 20 for the exhaust gas removal. Then the exhaust gas 34 is expelled to the atmosphere through each of the outlet pipes 24 for the exhaust gas removal. As a result the reactive powers $P_1$ 37 of the exhaust gas are added to the driving torque M 39 of the rotor.

Figure 13:
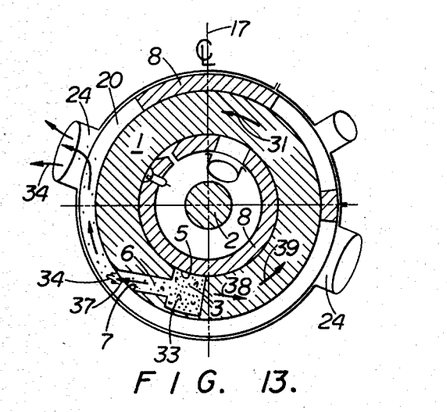
FIGS. 13 and 14 are representations of the ignition stroke inside each of the combustion chambers.
Figure 14:
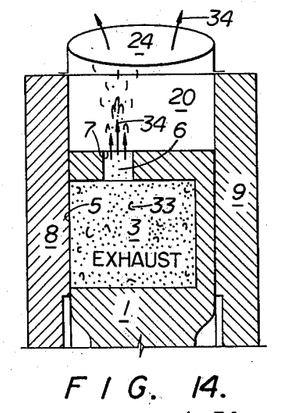

Referring now to FIGS. 13 and 14

In this moment in consequence of the driving torque M 39 of the rotor there occurs the ignition stroke of the present engine.

Figures 15, 16:
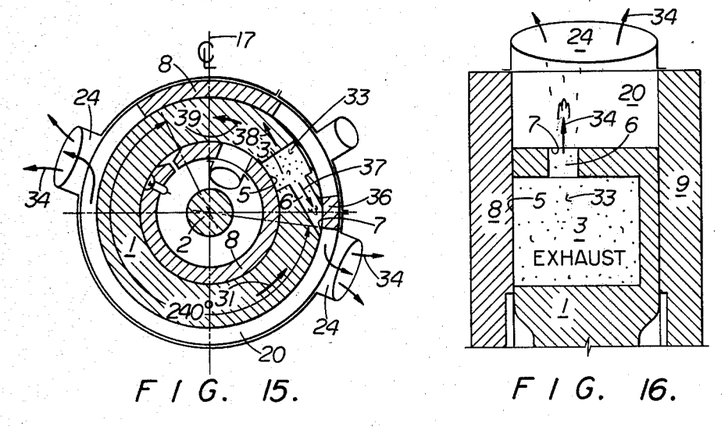
FIGS. 15 and 16 are representations of the end of the ignition stroke, and are representations of the end of the second period inside each of the combustion chambers.

Referring now to FIGS. 15 and 16

In this moment of the completion of the second period, the process of the exhaust gas removal and the action of the reactive powers $P_1$ 37 inside each of the combustion chambers 3 and 4 are being finished. Both of the reactive oval nozzles 7 are closing themselves simultaneously on the left stationary housing 8 and also on the right stationary housing 9. This is the end of the second period at which the exhaust gas 34 is removed to the atmosphere while the ignition stroke is completed at the same time. The second period corresponds to a 240° turning angle of the shaft 2 of the rotor or by the time it takes to make up 66.6% of the full complete cycle. Therefore we have an efficiency of approximately 60%.

Figure 17:
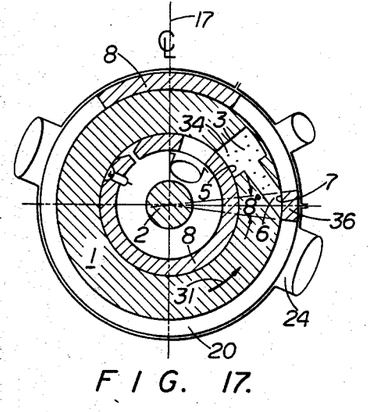
FIGS. 17 and 18 are representations of the neutral point inside each of the combustion chambers.
Figure 18:
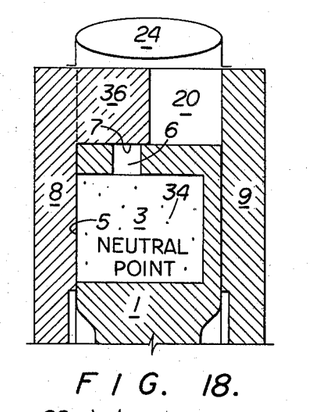

Referring now to FIGS. 17 and 18

In this location each of the reactive oval nozzles 7 remain closed with the left stationary housing 8 and with the right stationary housing 9. This is the neutral point, because the reactive oval nozzle 7 has the same space with the wall 36 of the admission canal 21. Both of them are corresponding to an 8° angle.

Figure 19:
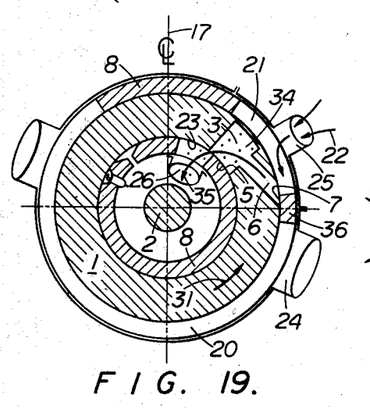
FIGS. 19 and 20 are representations of the beginning of the third period inside each of the combustion chambers.
Figure 20:
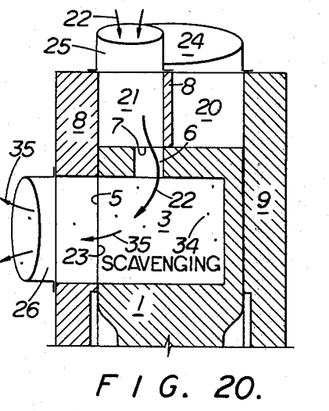

Referring now to FIGS. 19 and 20

In the beginning of the third period it is starting the simultaneous communication of the reactive oval nozzles 7 with their admission canals 21 and also of the round ports 5 of the cylindrical combustion chambers with their respective scavenging round ports 23. A stream of the fresh-air 22 is then injected inside each of the cylindrical combustion chambers 3 and 4 with a very high piston pressure through each of the admission canals 21 and through each of the reactive cylindrical ducts 6. A stream of the fresh-air 22 forces out the scavenging gas 35 through each of the scavenging round ports 23. From here the scavenging gas 35 penetrates inside each of the outlet pipes 26 for the scavenging gas removal. Then the scavenging gas 35 is thrown out into the atmosphere. On the whole, the forced thorough scavenging of the scavenging gas 35 is effected inside each of the cylindrical combustion chambers 3 and 4. The piston pressure feeding of the fresh-air 22 results from a compressor.

Figure 21:
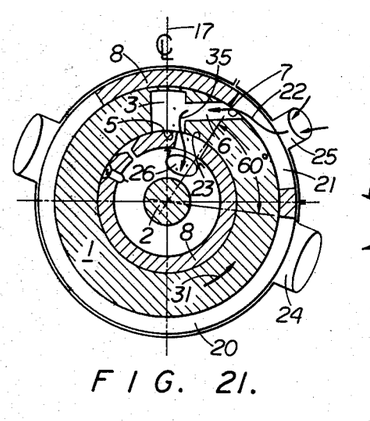
FIGS. 21 and 22 are representations of the end of the third period inside each of the combustion chambers.
Figure 22:
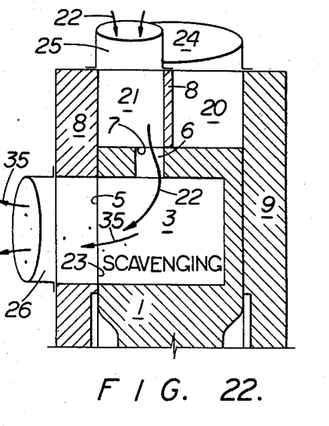

Referring now to FIGS. 21 and 22

In this moment of the completion of the third period the communication of the reactive oval nozzles 7 with their respective admission canals 21 and also of the round ports 5 of the cylindrical combustion chambers with their respective scavenging round ports 23 is ended. This is the end of the third period at which time the scavenging gas 35 is expelled to the atmosphere completely. As a result a new portion of the fuel-air mixture 16 does not blend with the exhaust gas 34. On the whole we have the complete combustion of the new portion of the fuel-air mixture 16. This circumstance results in a considerable reduction in the consumption of the fuel-air mixture 16 and also results in a considerable increase in the power of the present engine. The third period corresponds to a 60° turning angle of the shaft 2 of the rotor.

One of the present engine's cycle of each of the combustion chambers 3 and 4 is completely finished. It is corresponding to a 360° turning angle of the shaft 2 of the rotor. It starts the next cycle. It consists also of the three working periods.

The new principle and design of this engine allows it to consume one gallon of synthetic fuel per hour or to consume 0.80 gallon of gasoline per hour. This new principle allows an increased of engine speed of up to 20,000 revolutions per minute. All of this will result in a considerable increase in the power of the present engine. The capacity of the present engine will be 165 horsepower. This engine has an efficiency of approximately 60%.

I claim as my invention:

1. A rotary-reactive internal combustion engine of the type having a stator and a rotor which is rotatable in one direction, characterized by:
   A. the rotor having
      (1) a shaft with a disc fixed thereto intermediate its ends, said disc having flat and parallel opposite faces,
      (2) a pair of diametrically opposite cyclinders in the disc, each having a round port, said ports having the same diameter, said ports opening to opposite faces of the disc,
      (3) and a reactive duct in the disc leading to its periphery from each cylinder at an angle of 90° to the cylinder axis, said ducts having the same diameter, said ducts extending in a direction opposite to that of rotor rotation and each terminating in a reactive nozzle at the periphery of the disc, said nozzles extending circumferentially through an angle substantially 8°;
   B. the stator comprising similar left and right stator housings fixed to one another and overlying the opposite faces of the rotor disc, said housings having bearing means to rotatably receive the rotor shaft, said stator having
      (1) diametrically opposite air-fuel admission ports, one in each stator housing, located to be registrable with the cylinder ports during rotation of the rotor, said admission ports having the same diameter as the cylinder ports, and each such admission port having an injector nozzle through which air-fuel mixture must flow to reach its respective cylinder port,
      (2) diametrically opposite spark plugs, one in each stator housing, located in circumferentially spaced relation to its respective admission port by an angle of substantially 30° in the direction of rotor rotation, said spark plug located inside a niche means,
      (3) diametrically opposite exhaust canals, one in each stator housing, to receive combustion gases from the cylinders, each such canal extending circumferentially through an angle of substantially 232° in the direction of rotor rotation from a location adjacent to its associated admission port,
      (4) a first pair of diametrically opposite walls, one in each stator housing, located alongside the rotor periphery and extending through an arc of substantially 68° in a direction opposite to that of rotor rotation, from a location at the end of its exhaust canal first swept by the reactive nozzles in the rotor,
      (5) a second pair of diametrically opposite walls, one in each stator housing, located at the end of its exhaust canal last swept by the reactive nozzles and each such wall extending circumferentially through an angle substantially 8°,
      (6) diametrically opposite admission canals, one in each stator housing, for delivering high pressure fresh air circumferentially to the cylinders, each such canal being located between said first and second pairs of walls,
      (7) diametrically opposite scavenging ports, one in each stator housing, located to be registrable with the cylinder ports during rotation of the rotor, said scavenging port having the same diameter as the cylinder ports and being located substantially 60° from its associated admission port in the direction opposite to rotor rotation,
      (8) an exhaust pipe connected to each stator housing and leading outwardly from its exhaust canal from a location adjacent to its spark plug,
      (9) an admission pipe connected to each stator housing and located to supply high pressure fresh air to its admission canal,
      (10) and an outlet pipe connected to each stator housing in communication with its scavenging port.

2. An engine as in claim 1, wherein, as a consequence of the process of air-fuel mixture combustion in the cylinders, the chemical power of the fuel is transformed into thermic power, and after that, the thermic power is transformed into mechanical power.

3. An engine as in claim 2, in which the mechanical power of the exhaust gas inside each of the reactive ducts is transformed into reactive power.

4. An engine as in claim 3, in which the reactive power of the exhaust gas adds to the driving torque of the rotor.

5. An engine as in claim 1, which allows for the use of both gasoline and synthetic fuel on the order of methylated alcohol.

6. An engine, as in claim 1, in which one cycle of each of the cylinders consists of three working periods, corresponding to a 360° turning angle of the rotor shaft.

7. An engine as in claim 6, wherein the first period in each cylinder corresponds to a 60° turning angle of the rotor, and during which air-fuel mixture can be injected into the cylinders at a very high pressure.

8. An engine as in claim 6, wherein the second period inside each cylinder corresponds to a 240° turning angle of the rotor, and during which second period the process of ignition of the air-fuel mixture can occur along with travel of the exhaust gas through each of the reactive ducts so as to impart driving torque to the rotor before being expelled to the atmosphere.

9. An engine as in claim 6, wherein the third period inside each cylinder corresponds to a 60° turning angle of the rotor, and during which third period, a stream of fresh air can be injected into each cylinder with a very high pressure to effect scavenging of the cylinders.

* * * * *